W. KEENAN,

Assignor to himself and N. B. HOOPER.

Hat-Pouncing Machine.

No. 9,125. Reissued Mar. 23, 1880.

Witnesses
John Becker
Geo. T. Haynes

Inventor
William Keenan
by his Attorneys
Brown & Brown

N. PETERS, PHOTO-LITHOGRAPHER, WASHINGTON, D. C.

UNITED STATES PATENT OFFICE.

WILLIAM KEENAN, OF BROOKLYN, NEW YORK, ASSIGNOR TO HIMSELF AND NICHOLAS B. HOOPER.

HAT-POUNCING MACHINE.

SPECIFICATION forming part of Reissued Letters Patent No. 9,125, dated March 23, 1880.

Original No. 202,829, dated April 23, 1878. Application for reissue filed January 9, 1880.

*To all whom it may concern:*

Be it known that I, WILLIAM KEENAN, of the city of Brooklyn, county of Kings, and State of New York, have invented certain new and useful Improvements in Hat-Pouncing Machines, of which the following is a specification.

Figure 2:
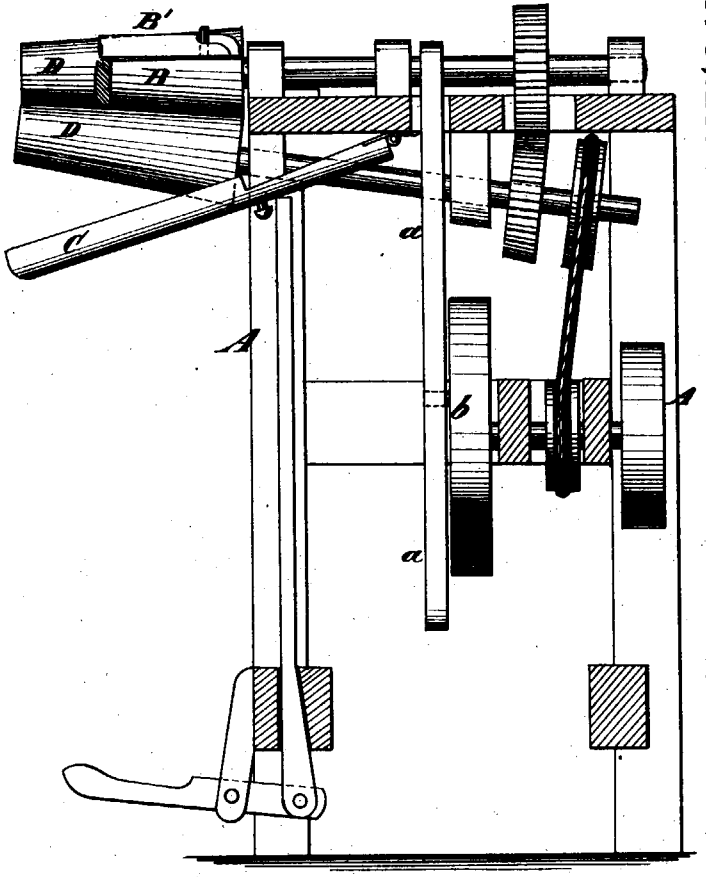
Figure 1:
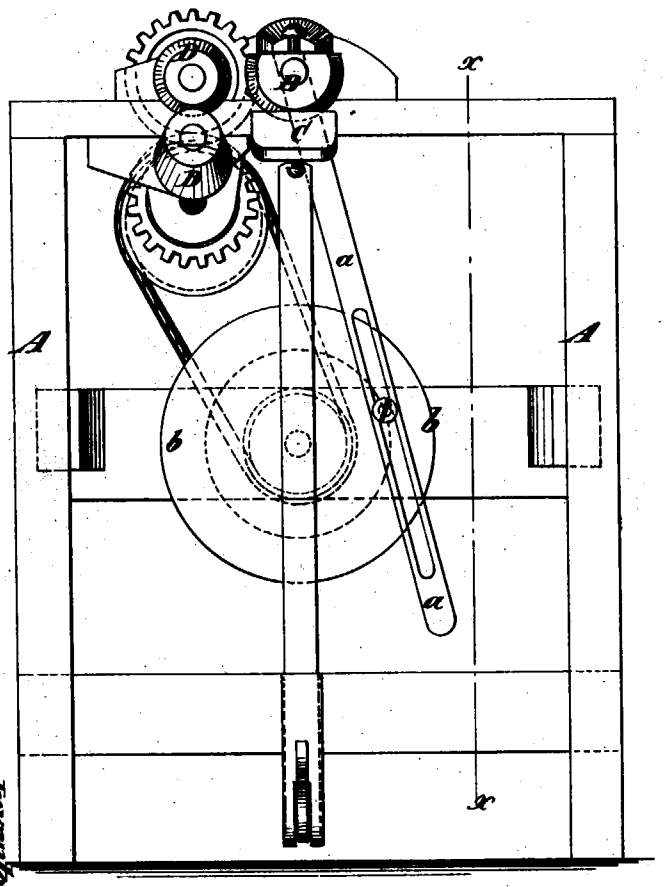

In the accompanying drawings, Figure 1 represents a front elevation, and Fig. 2 a vertical transverse section on line *x x*, Fig. 1, of a machine for pouncing the brims of hats embodying the features of my invention.

Similar letters of reference indicate corresponding parts.

One object of this invention is to imitate in the pouncing of hats, more especially the brims thereof, by machinery the action of pouncing by hand; and to this end one feature of the invention consists in a pouncing-block having a curved surface and a rotary reciprocating motion.

Other features of my invention consist in the combination, with said block, of a table or support for supporting the hat while subject to the action of the said block; means of providing for the movement of said table or support to permit the introduction of the hat between it and the said block and its removal therefrom, and to regulate the pressure applied in pouncing; and means of moving the hat while in contact with the said block, to provide for the pouncing of different parts of the hat-brim.

Referring to the drawings, A represents the frame of the machine, which supports, in suitable bearings at the top part, the shaft of the pouncing-block B, that may be covered in the usual manner with sand-paper, attached by a removable top slide-piece, B′. This pouncing-block B has a curved surface, and is represented of slightly conical shape, and it receives a rotary reciprocating motion. The means represented for imparting this motion consist of a crank-arm, *a*, that is affixed to the rear end of the shaft of the pouncing-block, and connected by its slotted end with a crank-pin of a disk or crank-arm, *b*, revolved by belt-and-pulley connection with the driving-shaft.

To the under side of the top of frame A is hinged a swinging table or support, C, with flat top surface, that is thrown by means of a treadle-and-rod connection toward the under side of the pouncing-block, so as to expose the hat-brim placed thereon to the pouncing action of the block. The pressure of the foot upon this treadle regulates the pressure of the pouncing-block on the hat-brim. When the pressure of the foot is removed from the treadle the table or support C falls away from the pouncing-block and permits the insertion of the hat-brim between it and the block and the removal of the same therefrom.

The uniform rotary reciprocating motion of the pouncing-block exerts an even pouncing action on the brim, in connection with conical draw-rolls D, that are arranged sidewise of the pouncing-block, and receive their motion by a bevel-gear placed on their inclined shafts, and by a belt-and-pulley connection with the revolving shaft of the crank-disk.

The uniform rotary reciprocating motion of the pouncing-block forms a close imitation of the work done by hand, and accomplishes the pouncing of hat-brims in a uniform, quick, and effective manner by the use of a very simple and effective mechanism.

I am aware that vibrating pouncing-plates provided with a treadle, by means of which they may be separated for the insertion or removal of a hat, in combination with laterally-adjustable feed-rollers, have heretofore been used; and this I do not claim.

Having thus fully described my invention, I claim as new and desire to secure by Letters Patent—

1. In a hat-pouncing machine, a pouncing-block having a curved surface and a rotary reciprocating motion, substantially as herein described.

2. The combination, in a hat-pouncing machine, of a pouncing-block having a curved surface and a rotary reciprocating motion, and a table or support below said block, substantially as herein described.

3. The combination, in a hat-pouncing machine, of a pouncing-block having a curved surface and a rotary reciprocating motion, a rising and falling table or support arranged below said block, and mechanical means of raising the said table or support and pressing it upward toward the said block.

4. The combination, in a hat-pouncing machine, of a pouncing-block having a curved surface and a rotary reciprocating motion, a table or support below said block, and mechanical means of moving the hat while in contact with said block, substantially as herein described.

5. The combination, in a hat-pouncing machine, of conical draw-rolls with a pouncing-block having a uniform rotary reciprocating motion, and with a hinged and treadle-acted table or support below the block, substantially as and for the purpose specified.

WILLIAM KEENAN.

Witnesses:
FREDK. HAYNES,
E. P. JESSUP.